(12) United States Patent
Heller et al.

(10) Patent No.: US 6,942,227 B2
(45) Date of Patent: Sep. 13, 2005

(54) FAILSAFE ACTUATOR

(75) Inventors: Joe Heller, Brighton, MI (US);
William H. Fort, Stratham, NH (US)

(73) Assignee: Stoneridge Control Devices, Inc., Canton, MA (US)

( * ) Notice: Subject to any disclaimer, the term of this patent is extended or adjusted under 35 U.S.C. 154(b) by 0 days.

(21) Appl. No.: 10/267,090

(22) Filed: Jul. 19, 2002

(65) Prior Publication Data
US 2003/0116928 A1 Jun. 26, 2003

Related U.S. Application Data

(60) Provisional application No. 60/306,628, filed on Jul. 19, 2001.

(51) Int. Cl.⁷ .......................................... B60G 17/005
(52) U.S. Cl. ............................ 280/5.502; 280/124.107
(58) Field of Search ..................... 280/5.501, 5.502, 280/5.506, 5.507, 5.508, 5.509, 124.106, 124.137, 124.149, 5.511, 124.107

(56) References Cited

U.S. PATENT DOCUMENTS

| | | | |
|---|---|---|---|
| 4,826,205 A | | 5/1989 | Kouda et al. ................ 280/703 |
| 4,919,440 A | * | 4/1990 | Tsukamoto .............. 280/5.502 |
| 5,032,995 A | | 7/1991 | Matsuda et al. ........ 364/424.03 |
| 5,032,997 A | | 7/1991 | Kawagoe ................ 364/424.05 |
| 5,092,625 A | | 3/1992 | Kawabata ................... 280/707 |
| 5,182,498 A | * | 1/1993 | Stuhr .......................... 318/15 |
| 5,243,324 A | | 9/1993 | Bober ......................... 340/439 |
| 5,288,101 A | * | 2/1994 | Minnett .................... 280/5.511 |
| 5,441,298 A | | 8/1995 | Miller et al. ................ 280/707 |
| 5,505,480 A | * | 4/1996 | Pascarella ............ 280/124.106 |
| 5,744,876 A | * | 4/1998 | Fangio ......................... 307/66 |
| 5,988,319 A | * | 11/1999 | Hudson et al. ........... 185/40 R |
| 6,179,310 B1 | | 1/2001 | Clare et al. ........... 280/124.159 |
| 6,295,490 B1 | | 9/2001 | Streib .......................... 701/29 |
| 6,428,019 B1 | | 8/2002 | Kincad et al. ........... 280/5.511 |
| 6,467,748 B1 | * | 10/2002 | Schick et al. ............... 248/550 |
| 6,637,757 B2 | | 10/2003 | Ignatius et al. .......... 280/5.511 |

OTHER PUBLICATIONS

International Search Report from International Appln. No. PCT/US03/22937 mailed Jun. 30, 2004.

Internaitonal Preliminary Examination Report from International Appln. No. PCT/US02/23179 mailed Jan. 28, 2005.

* cited by examiner

Primary Examiner—David R. Dunn
(74) Attorney, Agent, or Firm—Grossman Tucker Perreault & Pfleger, PLLC

(57) ABSTRACT

A failsafe actuator for returning an actuator driven element to a failsafe position in case of a failure condition is provided. The failsafe actuator may include mechanical or electrical means to provide a failsafe function. Such a failsafe actuator may be used in a stabilizer bar system of a vehicle to ensure that at least one stabilizer bar is returned to a failsafe or engaged condition should a failure condition occur when the stabilizer bar is disengaged. Various failure conditions can include loss of electrical power to the actuator or some internal actuator failures.

16 Claims, 4 Drawing Sheets

FAILSAFE ACTUATOR

CROSS REFERENCE TO RELATED APPLICATIONS

The present application claims the benefit of the filing date U.S. Provisional Patent Application Ser. No. 60/306,628, filed Jul. 19, 2001, the teachings of which are incorporated herein by reference.

FIELD OF THE INVENTION

The present invention relates generally to an actuator with a failsafe mechanism for permitting an actuator to move an actuator driven element, and in particular a vehicle stabilizer bar, to a safer default position in case of a failure condition such as an external or internal electrical failure.

BACKGROUND OF THE INVENTION

Vehicles, especially four wheel drive and off-road vehicles, may be equipped with a vehicle suspension system which includes a stabilizer bar or stabilizer bars (one for the front and one for the rear). Generally, a stabilizer bar includes a torsion bar that links two wheels together so they act in unison at high speed. For example, the stabilizer bar enhances drivability on smooth road surfaces by resisting instability as a vehicle changes lanes. On the other hand, the same high rigidity imparted by the stabilizer bar may degrade traction and independent wheel articulation on rough off-road surfaces. In addition, the high rigidity of the stabilizer bar may cause the traction of the left side and right side wheels to differ significantly causing differential transmission of driving torque which may further degrade road handling characteristics on rough road surfaces. Therefore, a stabilizer bar disconnect system driven by an actuator may be used to deactivate the stabilizer bar when driving on rough road conditions.

However, if failures such as external actuator electrical or internal actuator electrical failures occur, the actuator may become stuck in an "off-road" position with the stabilizer bar deactivated. This "off-road" position is undesirable for most smooth road driving conditions. Hence, reduced drivability could lead to a greater likelihood of accidents such as rollovers on smooth road conditions until the failure problem is repaired.

Accordingly, there is a need in the art for an actuator with a failsafe mechanism for controlling an actuator driven element, particularly a stabilizer bar mechanism in a vehicle, which permits return of the actuator driven element to a more safe default position in case of a failure condition such as an external or internal electrical failure.

BRIEF SUMMARY OF THE INVENTION

A failsafe actuator for returning an actuator driven element to a failsafe position in case of a failure condition consistent with the invention includes: a drive assembly configured to drive the actuator driven element, the drive assembly including a plunger having at least a first plunger position, the actuator driven element responsive to the plunger such that the actuator driven element is in the failsafe position when the plunger is in the first plunger position; a return mechanism; and an electromechanical mechanism configured to hold the plunger in at least a second plunger position and further configured to release the plunger upon detection of the failure condition thereby permitting the return mechanism to drive the plunger to the first plunger position and hence the actuator driven element to the failsafe position.

Another failsafe actuator for returning an actuator driven element to a failsafe position in case of a failure condition consistent with the invention includes: a drive assembly configured to drive a plunger from a first plunger position to a second plunger position; a return mechanism configured to drive the plunger from the second plunger position to the first plunger position, the actuator driven element responsive to the plunger such that the actuator driven element is in the failsafe position when the plunger is in the first plunger position; and an electromechanical mechanism configured to hold the plunger in at least the second plunger position and further configured to release the plunger upon detection of the failure condition thereby permitting the return mechanism to drive the plunger to the first plunger position and hence the actuator driven element to the failsafe position.

Another failsafe actuator for returning an actuator driven element to a failsafe position in case of a failure condition consistent with the invention includes: a drive assembly configured to drive the actuator driven element, the drive assembly including an electrical motor; and an electrical energy storage element coupled to the electrical motor, the electrical energy storage element providing sufficient electrical energy to the electrical motor to enable the electrical motor to drive the actuator driven element to the failsafe position upon detection of a failure condition.

Another failsafe actuator for returning an actuator driven element to a failsafe position in case of a failure condition consistent with the invention includes: a drive assembly for driving the actuator driven element; and an energy storage element in working relationship with the drive assembly, the energy storage element configured to provide replacement energy to drive the actuator driven element to the failsafe position in case of the failure condition.

A method for returning an element to a failsafe position in case of a failure condition consistent with the invention includes the steps of: driving a plunger from a first plunger position to a second plunger position; holding the plunger in at least the second plunger position; detecting the failure condition; releasing the plunger from the at least second plunger position upon detection of the failure condition; and driving the plunger from the at least second plunger position to the first plunger position, the element responsive to a position of the plunger such that the element is in the failsafe position when the plunger is in the first plunger position.

Another method for returning an element to a failsafe position in case of a failure condition consistent with the invention includes the steps of: driving the element from an electrically powered drive source; storing electrical energy in an electrical energy storage element; detecting the failure condition; and providing the energy from the storage step to the electrically powered drive source to drive the element to the failsafe position upon detection of the failure condition.

Another method for returning an element to a failsafe position in case of a failure condition consistent with the invention includes the steps of: storing energy; detecting the failure condition; and utilizing the energy from the storing step to return the element to a failsafe position.

A stabilizer bar system consistent with the invention includes: at least one stabilizer bar; a power source; an actuator receiving electrical power from the power source, the actuator comprising: a drive assembly configured to drive the at least one stabilizer bar, the drive assembly including a plunger having at least a first plunger position, the at least one stabilizer bar responsive to the plunger such that the at least one stabilizer bar is in the failsafe position when the plunger is in the first plunger position; a return mechanism; and an electromechanical mechanism configured to hold the plunger in at least a second plunger position and further configured to release the plunger upon detection of the failure condition thereby permitting the return mechanism to drive the plunger to the first plunger position and hence the at least one stabilizer bar to the failsafe position.

Another stabilizer bar system consistent with the invention includes: at least one stabilizer bar; a power source; an actuator receiving electrical power from the power source, the actuator including: a drive assembly configured to drive the at least one stabilizer bar, the drive assembly comprising an electrical motor configured to receive power from the power source; and an electrical energy storage element coupled to the electrical motor and the power source, the electrical energy storage element providing sufficient electrical energy to the electrical motor to enable the electrical motor to drive the at least one stabilizer bar to a failsafe position upon detection of a failure condition.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

The present invention relates generally to an actuator with a failsafe mechanism for permitting an actuator to move an actuator driven element to a more safe default position in case of a failure condition such as an external or internal electrical actuator failure. The present invention is described with reference to an actuator for activating and deactivating a stabilizer bar system in a vehicle. Those skilled in the art, however, will recognize that an actuator consistent with the present invention may be utilized in a host of other environments. Thus, it is to be understood that the present invention is not limited to the illustrated exemplary embodiments described herein. Rather, the present invention may be incorporated in a wide variety of actuators, and actuator systems and devices without departing from the spirit and scope of the present invention.

Figure 1:
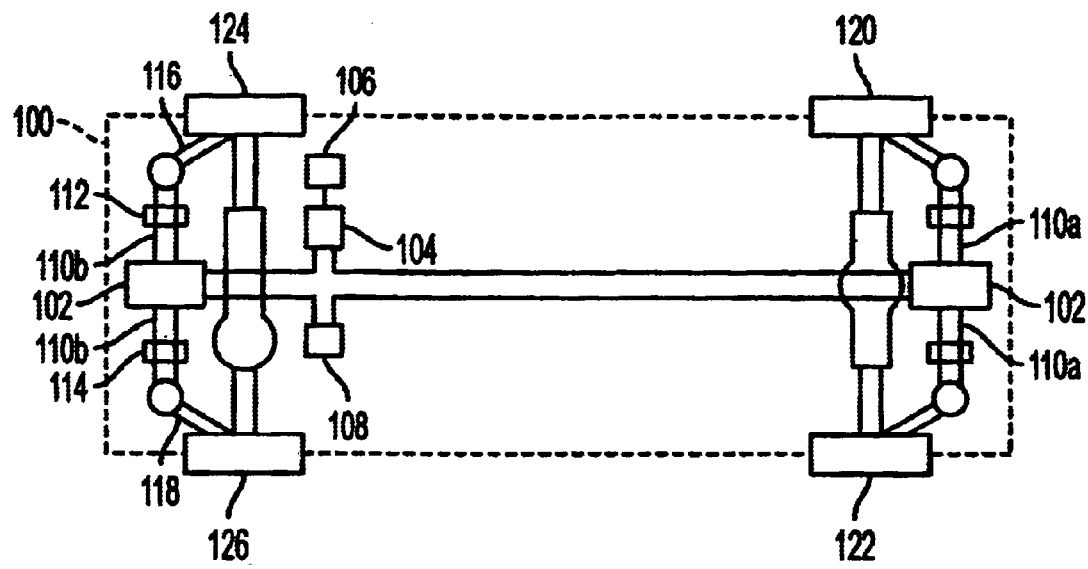
FIG. 1 is a simplified plan view of a vehicle having an exemplary actuator consistent with the present invention for driving a stabilizer bar of the vehicle.

Turning to FIG. 1, a simplified plan view of en exemplary vehicle 100 having actuator activated stabilizer bars 110a, 110b is illustrated. The stabilizer bars 110a; 110b maybe coupled to either the front wheels 120, 122 or rear wheels 124, 126 respectively through a pair of suspension links 116, 118. The stabilizer bars 110a, 110b may be further coupled to the body of the vehicle by a pair of brackets 112, 114. Those skilled in the art will recognize a variety of means for coupling the stabilizer bars 110a, 110b to the wheels and to the vehicle 100.

An actuator 102 consistent with the present invention may be coupled to one or both stabilizer bars 110a, 110b at a mid-point between the front wheels 120, 122 or the rear wheels 124, 126 for driving the stabilizer bar system into an activated and deactivated position. However, those skilled in the art will recognize a variety of configurations for coupling an actuator to one or both stabilizer bars. For example, the actuator may be located closer to the wheels or at any point along the stabilizer bars 110a, 110b. The actuator may also not be coupled to the stabilizer bars 110a, 110b directly, but rather to some driving means to drive the stabilizer bars 110a, 110b.

A controller 104 may provide control signals to the actuator 102 to move the stabilizer bars 110a, 110b into either an activated or deactivated state. An activated state would typically be for most driving conditions on smooth road surfaces, while a deactivated state would be for rough road surfaces at low speed. The controller may be responsive to an operator input, an input from another one of the vehicle control modules, or a sensor 106 for sensing the current type of road condition. A variety of such sensors, and positions for locating such sensors within the vehicle, are known to those skilled in the art. For example, one such sensor may be adapted to transmit ultrasonic waves towards the road surface and to receive or detect the ultrasonic waves reflected back by the road surfaces. Judging the variation of the received signals over time and comparing them to a predetermined range enables the sensor to determine if the road surface is rough or smooth. Other sensors may use light or laser beams.

A power source 108 provides electric power to the actuator 102. The power source may be any number of power sources including a vehicle battery or any part of the vehicle's electrical system driven by the alternator when the vehicle's motor is running.

Figure 2:
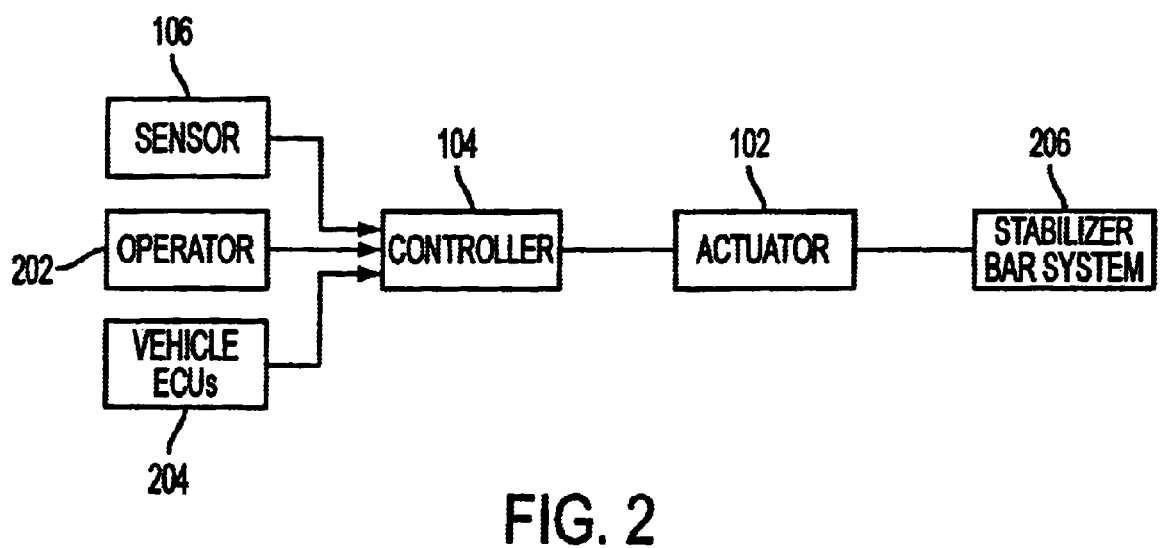
FIG. 2 is a simplified block diagram of an exemplary control system including an actuator consistent with the present invention for controlling the stabilizer bar system of FIG. 1.

In general, and with reference to the exemplary block diagram control system of FIG. 2, there are multiple ways to signal the stabilizer bar engagement system 206. One way is with a sensor 106. The sensor 106 senses when the vehicle is on a smooth or rough road surface and sends associated signals to the controller 104. Another way to signal the system is by operator command 202. The operator may elect to send a signal to the controller 104 through a switch. Yet another way to signal the controller is through any variety of the other vehicle control systems 204.

Once the controller 104 receives a signal from one of the various sources 106, 202, it may then confirm that all conditions are appropriate through communication with other vehicle systems. The controller 104 then, in turn, provides signals to the actuator 102 to deactivate or activate the stabilizer bar system 206 as desired. For instance, if an operator desires an off-road state the actuator 102 would deactivate the stabilizer bar system 206, or if the operator desired a normal operating mode the actuator 102 would activate the stabilizer bar system 206.

Advantageously, an actuator 102 consistent with the present invention includes a failsafe mechanism to ensure that the stabilizer bar system 206 is driven to its failsafe, or activated position, in case of a failure condition such as an interruption in power from the power source 108 or an internal electrical failure in the actuator 102.

Figure 3:
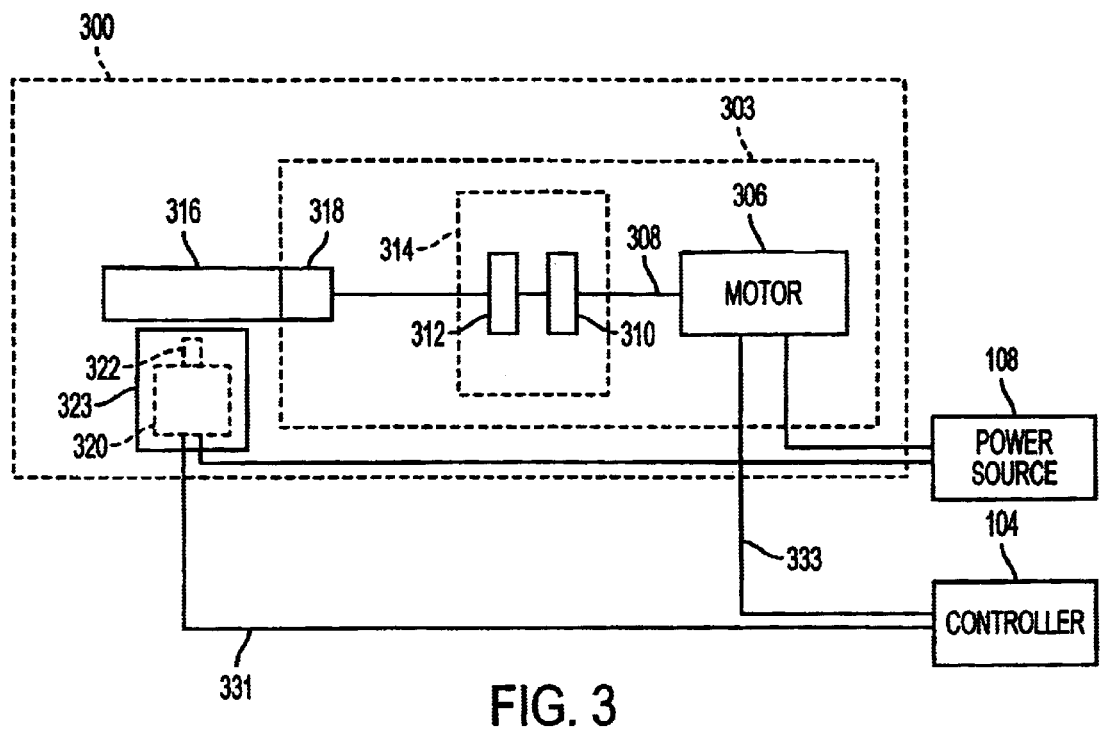
FIG. 3 is a simplified block diagram of an exemplary actuator consistent with the present invention having a mechanical failsafe system shown in a failsafe position.

Turning to FIG. 3, a simplified block diagram of an exemplary failsafe actuator 300 having a mechanical failsafe mechanism is illustrated. The actuator 300 is in a position that corresponds to a failsafe position for an actuator driven element (not shown). The actuator 300 includes a drive assembly 303 configured to drive an actuator driven element such as a stabilizer bar or stabilizer bar system. The drive assembly 303 may include a motor 306 with an output shaft 308, a gear train 314, and a plunger 318.

The gear train 314 may include a set of reduction gears 310, e.g., a planet gear arrangement. The gear train 314 may also include a lost motion device 312, e.g., a clutch. The gear train 314 may be coupled to a plunger 318 to drive the plunger axially. The plunger may also be rotated or driven in other directions. The plunger may be driven against a return mechanism 316, e.g., a compression spring.

Figure 4:
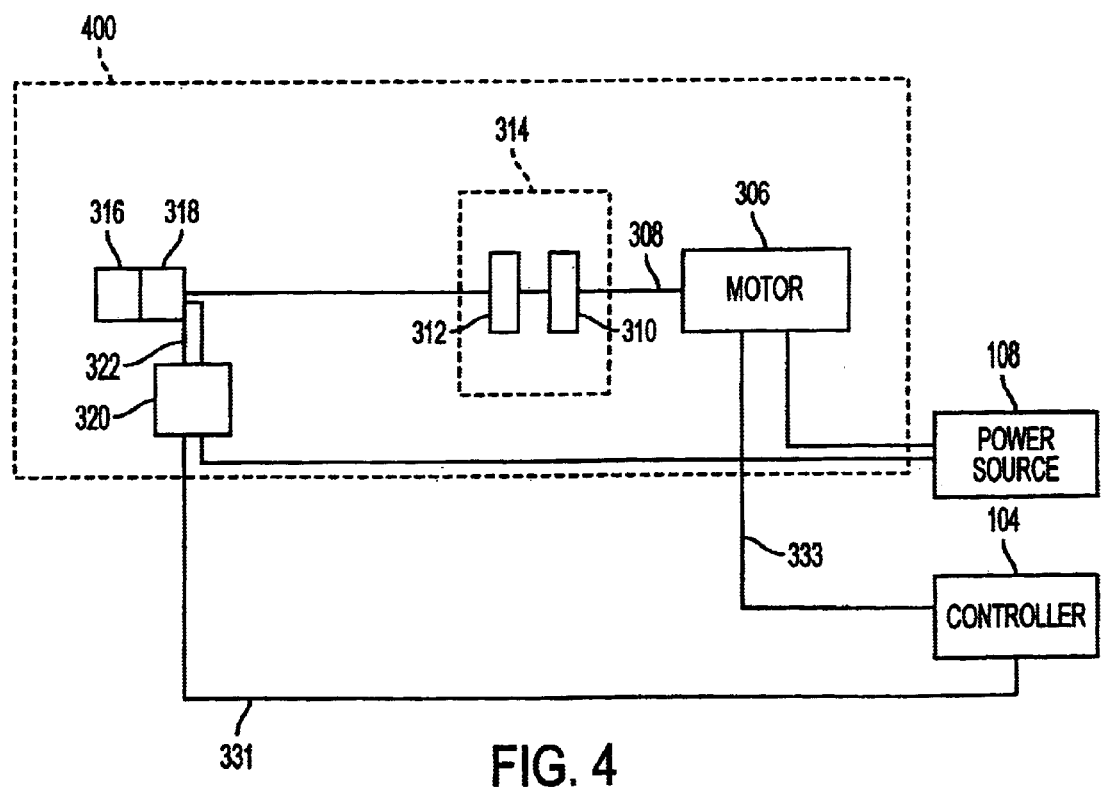
FIG. 4 is a simplified block diagram of the exemplary actuator of FIG. 3 in a non failsafe position.

As described more fully with reference to FIG. 4, an electromechanical mechanism 323 may also be provided to mechanically link to the actuator drive elements such that it can impede actuator output motion. For instance, one example of an electromechanical mechanism 323 is a solenoid 320 with a solenoid output shaft 322. The solenoid shaft 322 may be located perpendicular to the axially driven plunger 318. The solenoid 320 may also be controlled by a control signal through a separate control path 331 than the control path 333 for the motor 306.

Turning to FIG. 4, a simplified block diagram of the exemplary actuator of FIG. 3 in a non-failsafe position is illustrated. In a stabilizer bar system, the actuator position of FIG. 4 would result in a stabilizer bar disengaged position. For clarity, like parts from prior figures are represented by like numerals.

In operation, a signal (e.g., from sensor 106 or from operator input 202) is provided to the controller 104 to disengage the stabilizer bar system. The controller 104, in turn, provides a control signal to the motor 306 via control path 333. The output shaft 308 of the motor drives the plunger 318, through the gear train 314, axially away from the motor causing the return mechanism 316, e.g., a compression spring, to compress. The solenoid shaft 322 extends axially upward perpendicular to the axially extending plunger 318. The motor 306 may then be turned off while the plunger 318 and return mechanism 316 are held in a stabilizer bar disengaged position by the solenoid shaft 322.

The plunger 318 may be held until the controller 104 provides a proper control signal indicating smooth road conditions and triggering the plunger to return to its failsafe position of FIG. 3. In addition, a failure condition would also trigger return of the plunger 318 to the failsafe position of FIG. 3. For instance, the plunger may be held in its retracted position as long as a small holding current is applied to the solenoid 320 by the power source 108. In case of an external or internal electric failure causing interruption of the holding current, the solenoid output shaft 322 would self-retract to a retracted position. Such self-retraction force of the solenoid shaft 322 may be provided by an internal solenoid compression means, e.g., compression spring.

The return mechanism 316 biased against the plunger 318 may provide axial force in a direction back towards the motor. Advantageously, if necessary, the lost motion device 312, e.g., a clutch, may also be in its released position thereby aiding the return mechanism 316 to back drive the plunger against the gear train 314 with less force. As such, a failsafe mechanism is provided to back drive the plunger to its failsafe position of FIG. 3 in case of a failure condition such as an external or internal electric power failure.

In designing and choosing a return mechanism 316 and electromechanical mechanism 320, the retraction force of the electromechanical mechanism, e.g., the retraction force of the solenoid output shaft 322, should be greater than the frictional forces induced by return mechanism. The retraction mechanism 316 should also provide enough force to back drive the plunger 318 against the gear train 314. Again, the use of the lost motion device, e.g., clutch 312, may enable this to occur with a modest retraction mechanism exhibiting less force. If there is no clutch, the retraction mechanism 316 should provide a greater force than if there is a clutch. The clutch is optional depending on the particulars of the system including the desired retraction mechanism and its associated retraction force.

Figure 5:
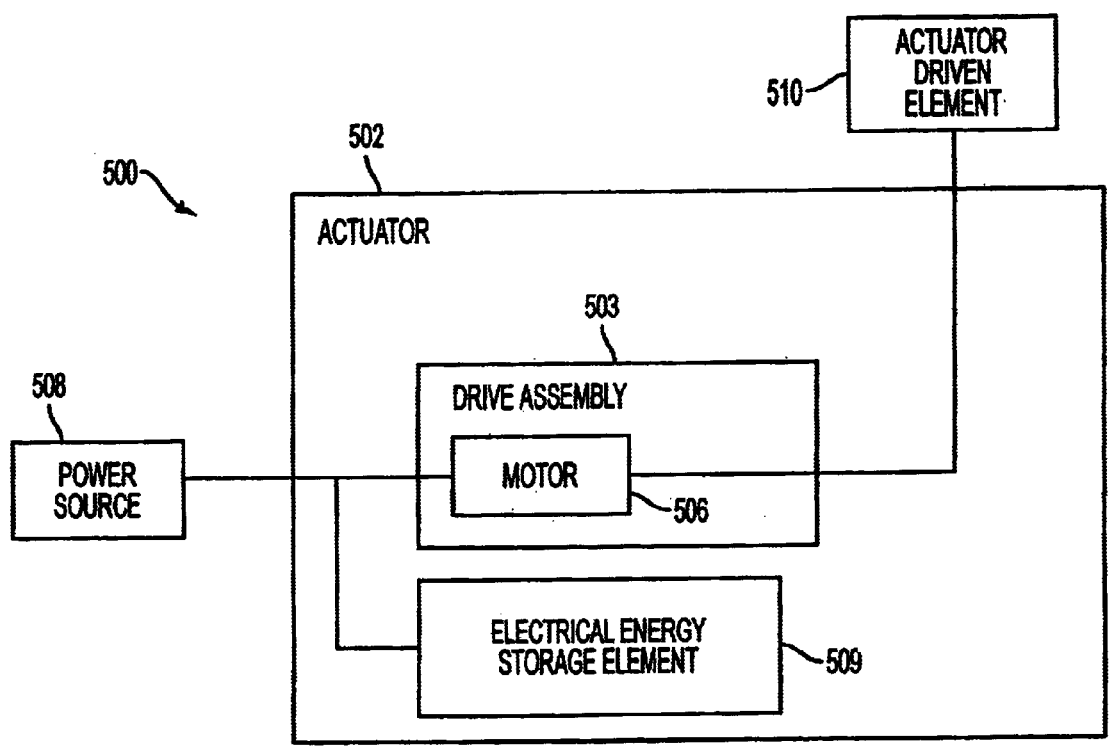
FIG. 5 is a simplified block diagram of another exemplary actuator consistent with the invention having an electrical failsafe system including an electrical energy storage element.

Turning to FIG. 5, a simplified block diagram system 500 of another exemplary actuator 502 consistent with the invention having an electrical failsafe system including an electrical energy storage element 509 is illustrated. In operation, the power source 508 normally provides power to the electrical motor 506 of the drive assembly 503. The drive assembly 503 in turn drives the actuator driven element 510. When the power source 508 is normally available, it serves to also charge the electrical energy storage element 509. Such element 509 may be any variety of devices known in the art for storing electric energy, e.g., a rechargeable battery, a capacitor, an inductor, and the like. Such element should be sized appropriately to provide sufficient electrical energy to the motor 506 such that the actuator driven element 510 may be driven to a failsafe position upon detection of a failure condition. For instance, such a failure condition may be loss of power from the power source 508 to the motor 506.

Figure 6:
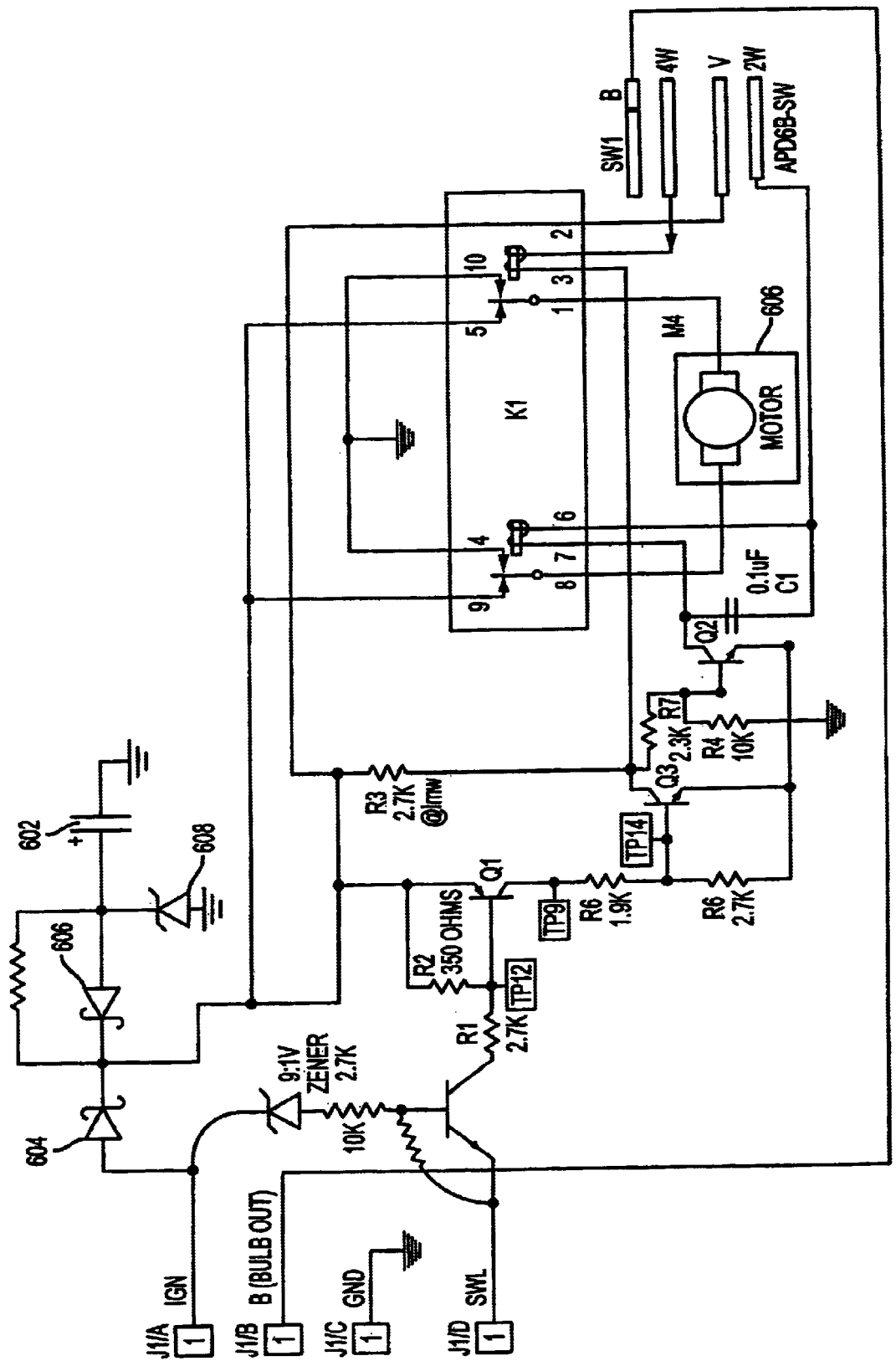
FIG. 6 is an exemplary circuit diagram of the actuator of FIG. 5.

Turning to FIG. 6, one exemplary circuit diagram for the actuator of FIG. 5 is illustrated. Those skilled in the art will recognize a variety of circuit configurations and electrical energy storage elements that may be used without departing from the scope of the present invention. The electrical energy storage element of FIG. 6 is a capacitor 602. The capacitor 602 should be large enough to provide sufficient electrical energy to the motor 606 to provide for a single actuation under worst-case conditions. For one exemplary capacitor 602, this would require a capacitor of 1 Farad at −40 degrees Celsius capable of being charged to 15 volts. A plurality of zener diodes 604, 606, 608 may also be provided to direct current flow to the capacitor 602 under normal charging conditions and from the capacitor under failsafe operation conditions.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A vehicle stabilizer bar system comprising:
   at least one vehicle stabilizer bar; and
   an actuator comprising:
   a drive assembly comprising a motor configured to drive an output member from a first position to a second position; said vehicle stabilizer bar being responsive to said output member such that vehicle stabilizer bar is in a first stabilizer bar state when said output member is in said first position and is in a second stabilizer bar state when said output member is in said second position;
   a return mechanism configured to drive said output member from said second position to said first position; and an electromechanical mechanism configured to maintain said output member in said second position and further configured to release said output member upon interruption of electrical power to said electromechanical mechanism thereby permitting said return mechanism to drive said output member to said first position.

2. The system of claim 1, wherein said output member comprises a plunger.

3. The system of claim 1, wherein said return mechanism comprises a spring.

4. The system of claim 1, wherein said motor comprises an output shaft coupled to said output member through a gear train, said gear train comprising a clutch configured to release when said output member is in said second position.

5. The system of claim 1, wherein said electromechanical mechanism comprises a solenoid having a solenoid shaft configured to maintain said output member in said second position.

6. The system of claim 5, wherein said solenoid shaft is configured to move to a retracted position upon interruption of electrical power to said electromechanical mechanism to thereby release said output member from said second position.

7. The system of claim 1, wherein said first stabilizer bar state is an engaged state of said stabilizer bar and said second stabilizer bar state is a disengaged state of said stabilizer bar.

8. An actuator comprising:
a drive assembly comprising a motor configured to drive an output member from a first position to a second position, said motor comprising an output shaft coupled to said output member through a near train, said gear train comprising a clutch configured to release when said output member is in said second position;
a return mechanism configured to drive said output member from said second position to said first position; and
an electromechanical mechanism configured to maintain said output member in said second position and further configured to release said output member upon interruption of electrical power to said electromechanical mechanism thereby permitting said return mechanism to drive said output member to said first position.

9. The actuator of claim 8, wherein said output member comprises a plunger.

10. The actuator of claim 8, wherein said return mechanism comprises a spring.

11. The actuator of claim 8, wherein said electromechanical mechanism comprises a solenoid having a solenoid shaft configured to maintain said output member in said second position.

12. The actuator of claim 11, wherein said solenoid shaft is configured to move to a retracted position upon interruption of electrical power to said electromechanical mechanism to thereby release said output member from said second position.

13. A method of operating an actuator to drive vehicle stabilizer bar comprising:
energizing a motor to drive an actuator output member from a first position to a second position to thereby move said vehicle stabilizer bar from a first stabilizer bar state to a second stabilizer bar state;
energizing an electromechanical mechanism to maintain said output member in said second position;
releasing said output member from said second position upon interruption of electrical power to the actuator; and
driving said output member from said second position to said first position to thereby move said vehicle stabilizer bar from said second stabilizer bar state to said first stabilizer bar state.

14. The method of claim 13, wherein said output member is driven from said second position to said first position by a return mechanism.

15. The method of claim 14, wherein said return mechanism comprises a spring.

16. The method of claim 13, wherein said first stabilizer bar state is a disengaged state of said stabilizer bar and said second stabilizer bar state is a disengaged state of said stabilizer bar.

* * * * *